US008386965B2

(12) United States Patent
Fleizach et al.

(10) Patent No.: US 8,386,965 B2
(45) Date of Patent: Feb. 26, 2013

(54) TECHNIQUES AND SYSTEMS FOR ENHANCING TOUCH SCREEN DEVICE ACCESSIBILITY THROUGH VIRTUAL CONTAINERS AND VIRTUALLY ENLARGED BOUNDARIES

(75) Inventors: Christopher B. Fleizach, Santa Clara, CA (US); Eric Taylor Seymour, San Jose, CA (US)

(73) Assignee: Apple Inc., Cupertino, CA (US)

( * ) Notice: Subject to any disclaimer, the term of this patent is extended or adjusted under 35 U.S.C. 154(b) by 461 days.

(21) Appl. No.: 12/688,558

(22) Filed: Jan. 15, 2010

(65) Prior Publication Data

US 2011/0179388 A1    Jul. 21, 2011

(51) Int. Cl.
*G06F 3/00*    (2006.01)
*G06F 3/048*    (2006.01)

(52) U.S. Cl. ........ 715/865; 715/708; 715/863; 715/864; 345/173

(58) Field of Classification Search .................. 715/840, 715/708, 863–865; 345/173
See application file for complete search history.

(56) References Cited

U.S. PATENT DOCUMENTS

| | | | | |
|---|---|---|---|---|
| 4,763,356 A | * | 8/1988 | Day et al. ....................... | 379/368 |
| 5,119,079 A | * | 6/1992 | Hube et al. ..................... | 715/823 |
| 5,412,189 A | | 5/1995 | Cragun | |
| 5,543,588 A | * | 8/1996 | Bisset et al. ............... | 178/18.06 |
| 5,729,219 A | * | 3/1998 | Armstrong et al. ............. | 341/20 |
| 5,805,157 A | * | 9/1998 | Bertram et al. ................ | 715/773 |
| 5,805,159 A | * | 9/1998 | Bertram et al. ................ | 715/764 |
| 5,812,131 A | * | 9/1998 | Bertram ........................ | 715/798 |
| 5,825,352 A | * | 10/1998 | Bisset et al. ................... | 345/173 |
| 5,831,664 A | * | 11/1998 | Wharton et al. ................. | 725/81 |
| 5,870,083 A | * | 2/1999 | Shieh ............................ | 345/173 |
| 5,914,716 A | * | 6/1999 | Rubin et al. .................... | 715/779 |
| 5,956,025 A | * | 9/1999 | Goulden et al. ................ | 715/716 |
| 6,002,395 A | * | 12/1999 | Wagner et al. ................. | 715/763 |
| 6,049,328 A | | 4/2000 | Vanderheiden | |
| 6,160,553 A | * | 12/2000 | Robertson et al. ............. | 715/767 |
| 6,259,436 B1 | * | 7/2001 | Moon et al. .................... | 345/173 |
| 6,331,840 B1 | | 12/2001 | Nielson et al. | |
| 6,335,725 B1 | * | 1/2002 | Koh et al. ...................... | 345/173 |
| 6,489,951 B1 | * | 12/2002 | Wong et al. ................... | 345/173 |
| 6,560,612 B1 | * | 5/2003 | Yamada et al. ....................... | 1/1 |

(Continued)

OTHER PUBLICATIONS

Communication Relating to the Results of the Partial International Search, Jun. 29, 2011, International Application No. PCT/US2011/021010, 10 pp.

(Continued)

*Primary Examiner* — Steven B Theriault
(74) *Attorney, Agent, or Firm* — Morgan, Lewis & Bockius LLP

(57) ABSTRACT

Techniques for increasing accessibility of touch-screen devices are disclosed. In one aspect, container regions on a touch-sensitive user interface of a touch screen device are defined. A touch event corresponding to a location on the user interface is received, and it is determined that the location corresponds to a particular container region. When another touch event is received, content is determined according to a context of the particular container region. The content is then presented. In another aspect, data specifying locations of user interface items on a user interface is received. The data is modified to enlarge an area for a particular item. A touch input event corresponding to a particular location on the user interface is received. It is determined that the location is within the enlarged area for the item, and input is provided to an application indicating that the item was selected.

54 Claims, 12 Drawing Sheets

U.S. PATENT DOCUMENTS

| | | | |
|---|---|---|---|
| 6,757,001 B2* | 6/2004 | Allport | 715/840 |
| 6,882,299 B1* | 4/2005 | Allport | 341/176 |
| 7,158,123 B2* | 1/2007 | Myers et al. | 345/173 |
| 7,178,109 B2* | 2/2007 | Hewson et al. | 715/790 |
| 7,296,241 B2* | 11/2007 | Oshiro et al. | 715/778 |
| 7,307,509 B2* | 12/2007 | Chriss | 340/286.07 |
| 7,383,515 B2* | 6/2008 | Bardon et al. | 715/823 |
| 7,453,442 B1* | 11/2008 | Poynter | 345/173 |
| 7,483,880 B2* | 1/2009 | Rossi et al. | 1/1 |
| 7,673,241 B2* | 3/2010 | Sun et al. | 715/729 |
| 7,703,041 B2* | 4/2010 | Ito et al. | 715/804 |
| 7,730,401 B2* | 6/2010 | Gillespie et al. | 715/702 |
| 7,747,964 B2* | 6/2010 | Morikawa | 715/781 |
| 7,880,728 B2* | 2/2011 | de los Reyes et al. | 345/173 |
| 7,900,156 B2* | 3/2011 | Andre et al. | 715/773 |
| 8,004,398 B2* | 8/2011 | Chriss | 340/539.12 |
| 8,079,039 B2* | 12/2011 | Lavoie et al. | 719/315 |
| 8,108,793 B2* | 1/2012 | Nguyen et al. | 715/792 |
| 2002/0018051 A1 | 2/2002 | Singh | |
| 2004/0066422 A1* | 4/2004 | Chandane | 345/865 |
| 2005/0024322 A1* | 2/2005 | Kupka | 345/156 |
| 2005/0057524 A1 | 3/2005 | Hill et al. | |
| 2005/0134578 A1* | 6/2005 | Chambers et al. | 345/184 |
| 2005/0193351 A1 | 9/2005 | Huoviala | |
| 2005/0216826 A1* | 9/2005 | Black et al. | 715/502 |
| 2005/0235206 A1* | 10/2005 | Arend et al. | 715/705 |
| 2005/0235208 A1* | 10/2005 | Arend et al. | 715/712 |
| 2005/0235223 A1* | 10/2005 | Arend et al. | 715/792 |
| 2005/0246665 A1* | 11/2005 | Luke et al. | 715/864 |
| 2006/0026521 A1 | 2/2006 | Hotelling et al. | |
| 2006/0036944 A1 | 2/2006 | Wilson | |
| 2006/0069694 A1* | 3/2006 | Rossi et al. | 707/101 |
| 2006/0105301 A1* | 5/2006 | Chriss | 434/112 |
| 2006/0123359 A1* | 6/2006 | Schatzberger | 715/810 |
| 2006/0181519 A1 | 8/2006 | Vernier et al. | |
| 2006/0267966 A1 | 11/2006 | Grossman et al. | |
| 2006/0294472 A1* | 12/2006 | Cheng et al. | 715/771 |
| 2007/0097096 A1 | 5/2007 | Rosenberg | |
| 2007/0130538 A1* | 6/2007 | Chiu | 715/792 |
| 2007/0157094 A1* | 7/2007 | Lemay et al. | 715/717 |
| 2007/0198950 A1* | 8/2007 | Dodge et al. | 715/815 |
| 2007/0236474 A1 | 10/2007 | Ramstein | |
| 2007/0247443 A1 | 10/2007 | Philipp | |
| 2008/0016467 A1* | 1/2008 | Chambers et al. | 715/835 |
| 2008/0016468 A1* | 1/2008 | Chambers et al. | 715/835 |
| 2008/0134017 A1* | 6/2008 | Inoguchi et al. | 715/234 |
| 2008/0148181 A1* | 6/2008 | Reyes et al. | 715/801 |
| 2008/0165133 A1* | 7/2008 | Blumenberg et al. | 345/173 |
| 2008/0165151 A1* | 7/2008 | Lemay et al. | 345/173 |
| 2008/0192021 A1* | 8/2008 | Lim et al. | 345/173 |
| 2008/0222622 A1* | 9/2008 | Lavoie et al. | 717/153 |
| 2008/0225153 A1* | 9/2008 | Fagans | 348/333.01 |
| 2008/0229248 A1* | 9/2008 | Fagans et al. | 715/838 |
| 2009/0005032 A1* | 1/2009 | Lunati et al. | 455/426.1 |
| 2009/0027334 A1* | 1/2009 | Foulk et al. | 345/157 |
| 2009/0064055 A1* | 3/2009 | Chaudhri et al. | 715/863 |
| 2009/0093242 A1* | 4/2009 | Bhalekar et al. | 455/418 |
| 2009/0178008 A1* | 7/2009 | Herz et al. | 715/840 |
| 2009/0228807 A1* | 9/2009 | Lemay | 715/752 |
| 2009/0244019 A1* | 10/2009 | Choi | 345/173 |
| 2009/0256780 A1* | 10/2009 | Small et al. | 345/55 |
| 2009/0289913 A1* | 11/2009 | Chang et al. | 345/173 |
| 2009/0307266 A1* | 12/2009 | Fleizach et al. | 707/103 Y |
| 2010/0041382 A1* | 2/2010 | Van Os et al. | 455/418 |
| 2010/0060586 A1* | 3/2010 | Pisula et al. | 345/169 |
| 2010/0088654 A1* | 4/2010 | Henhoeffer | 715/863 |
| 2010/0185989 A1* | 7/2010 | Shiplacoff et al. | 715/856 |
| 2010/0309147 A1* | 12/2010 | Fleizach et al. | 345/173 |
| 2010/0309148 A1* | 12/2010 | Fleizach et al. | 345/173 |
| 2010/0313125 A1* | 12/2010 | Fleizach et al. | 715/702 |
| 2011/0022607 A1* | 1/2011 | Fritzley et al. | 707/752 |
| 2011/0078622 A1* | 3/2011 | Missig et al. | 715/784 |
| 2011/0113364 A1* | 5/2011 | Neil et al. | 715/802 |
| 2011/0145753 A1* | 6/2011 | Prakash | 715/783 |

OTHER PUBLICATIONS

"Multimodal Requirements for Voice Markup Languages," W3C Working Draft Jul. 10, 2000 [online] [retrieved on Nov. 24, 2009]. Copyright © 2000 WC3®. Retrieved from: http://www.w3.org/TR/multimodal-reqs.

Nezu, T., "Mitsubishi Demos '3D Touch Panel'—Tech-On!" Nikkei Electronics, Mar. 11, 2009 [online] [retrieved on Jan. 15, 2010]. Retrieved from: http://techon.nikkeibp.co.jp/english/NEWS_EN/20090310/166952/?P=1, 2 pages.

Rekimoto, J., Ishizawa, T., Schwesig, C., Oba, H., "PreSense: Interaction Techniques for Finger Sensing Input Devices," [online] UIST '03 Vancouver, BC, Canada, © ACM 2003, CHI Letters, vol. 5, Issue 2, Retrieved from: ftp.csl.sony.co.jp/person/rekimoto/papers/rekimoto-uist03.pdf, pp. 203-212.

"Use of Audio-Haptic Interface Techniques to Allow Nonvisual Access to Touchscreen Appliances," thompson/papers/1995/ijhst.s95 [online] [retrieved Dec. 16, 2009], Retrieved from: http://trace.wise.edu/docs/audio_haptic_interfaces/audio_h.html, 10 pages.

\* cited by examiner

TECHNIQUES AND SYSTEMS FOR ENHANCING TOUCH SCREEN DEVICE ACCESSIBILITY THROUGH VIRTUAL CONTAINERS AND VIRTUALLY ENLARGED BOUNDARIES

TECHNICAL FIELD

This subject matter is generally related to device accessibility.

BACKGROUND

Touch screen devices allow users to provide touch inputs to select and modify user interface items displayed on the touch screen. For example, a user can touch an icon to launch an application on a touch screen device, or can touch user-selectable controls displayed on a touch screen device to invoke certain device functionality.

However, users, especially visually impaired users, may have difficulty locating items of interest that are displayed on a touch screen device. For example, when the display itself is relatively large, and the content displayed on the device is relatively small, it may be difficult for visually impaired users to locate the area of the display that they are interested in. As another example, when different information is clustered together on a screen, such as when an e-mail application is adjacent to a calendar application, a user may have difficulty locating the needed information on the screen.

SUMMARY

Techniques and systems are disclosed that allow users to navigate within and between groups of similar items displayed on a user interface of a touch screen device. These techniques can also allow users to more easily touch desired items displayed on a user interface of a touch screen device.

In one aspect, container regions corresponding to physical regions on a touch-sensitive user interface of a touch screen device are defined. A first touch input at a first location on the user interface is received. The device determines that the first location corresponds to a particular container region. When a second touch input is received, the device determines appropriate content in response to the second touch input. The appropriate content is determined according to a context of the particular container region and independent of the location where the other touch event was received. The content can then be presented.

In another aspect, data specifying the locations of user interface items on a touch-sensitive user interface of a touch screen device is received. The data is modified to enlarge an area on the touch-sensitive user interface associated with a particular item displayed on the touch screen interface. Touch input at a particular location on the user interface is received. It is determined that the particular location is within the enlarged area for the particular user interface item, and input is provided to an application executing on the touch screen device indicating that the particular user interface item was selected.

Particular embodiments of the subject matter described in this specification can be implemented to realize one or more of the following advantages. Users can more easily navigate the screen of a touch screen device without needing to see the screen. Users can easily move between areas of the screen of a touch screen device, and can easily move between individual items displayed on the screen. Users can more easily navigate screen touch screen devices with large sections of empty space on the screen. Users can reduce the amount of time they spend exploring a large touch screen space in search of a particular item displayed on the screen. Users can quickly obtain information about the meta-layout of items displayed on the screen by obtaining information about containers corresponding to the layout of the items.

DESCRIPTION OF DRAWINGS

Like reference numbers and designations in the various drawings indicate like elements.

DETAILED DESCRIPTION

Example Device

Figure 1:
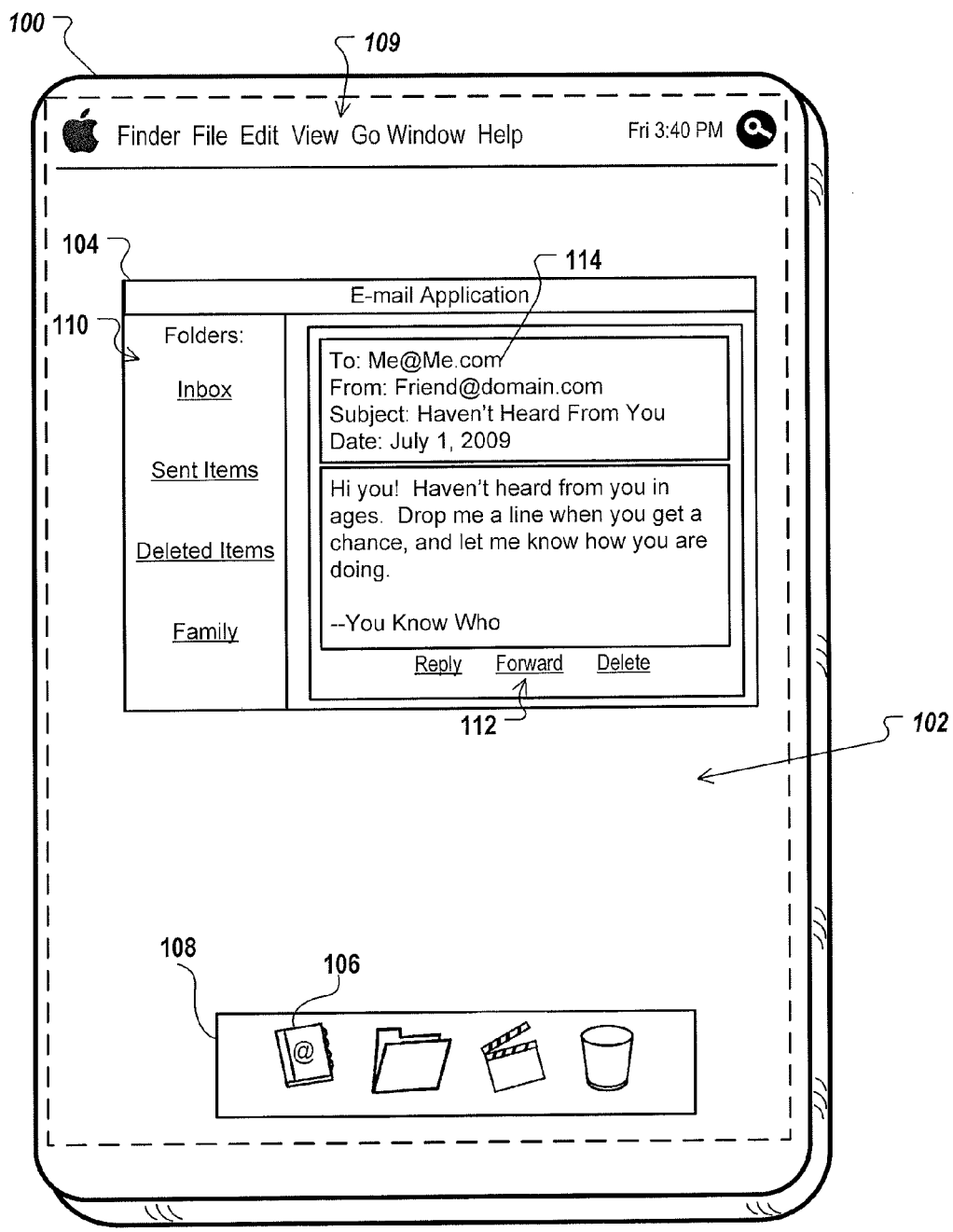
FIG. 1 illustrates an example device.

FIG. 1 illustrates example device 100. Device 100 can be, for example, a computer, a tablet computer, a handheld computer, a personal digital assistant, a cellular telephone, a network appliance, a camera, a smart phone, an enhanced general packet radio service (EGPRS) mobile phone, a network base station, a media player, a navigation device, an email device, a game console, a laptop computer, or a combination of any two or more of these data processing devices or other data processing devices.

Device Overview

In some implementations, device 100 includes touch-sensitive display 102. Touch-sensitive display 102 can implement liquid crystal display (LCD) technology, light emitting polymer display (LPD) technology, or some other display technology. Touch-sensitive display 102 can be sensitive to haptic and/or tactile contact with a user. In some implementations, touch-sensitive display 102 is also sensitive to touch inputs received in proximity to, but not actually touching, display 102. In addition, device 100 can include a touch-sensitive surface (e.g., a trackpad or touchpad).

In some implementations, touch-sensitive display 102 can include a multi-touch-sensitive display. A multi-touch-sensitive display can, for example, process multiple simultaneous points of input, including processing data related to the pressure, degree, and/or position of each point of input. Such processing facilitates gestures and interactions with multiple fingers, chording, and other interactions. Other touch-sensitive display technologies can also be used, e.g., a display in which contact is made using a stylus or other pointing device.

A user can interact with device 100 using various touch inputs, for example, when a user touches touch-sensitive display 102. Gesture inputs can also be derived from multiple touch inputs, e.g., where a user moves his or her finger (or other input tool) across touch-sensitive display 102. An example gesture input is a swipe input, where a user swipes his or her finger (or other input tool) across the screen of touch-sensitive display 102. In some implementations, device 100 can detect inputs that are received in direct contact with display 102, or that are received within a particular vertical distance of display 102 (e.g., within one or two inches of display 102). Users can simultaneously provide input at multiple locations on display 102. For example, inputs simultaneously touching at two or more locations can be received.

In some implementations, device 100 can display one or more graphical user interfaces on touch-sensitive display 102 for providing the user access to various system objects and for conveying information to the user. In some implementations, the graphical user interface can include one or more user interface items, e.g., user interface items 104 and 106. In the example shown, user interface items 104 and 106 are graphic representations of system objects. Some examples of system objects include device functions, applications, windows, files, alerts, events, or other identifiable system objects. In some implementations, the user interface items can be configured by a user (e.g., a user may specify which user interface items are displayed) and/or may download additional applications or other software that provides other functionalities and corresponding user interface items.

Example Device Functionality

In some implementations, device 100 can implement various device functionalities. As part of one or more of these functionalities, device 100 presents graphical user interfaces on touch-sensitive display 102 of device 100, and also responds to input received from a user, for example, through touch-sensitive display 102. For example, a user can invoke various functionality by launching one or more applications on the device. A user can invoke functionality, for example, by touching one of the user interface items in menu bar 108 of the device. For example, touching user interface item 106 invokes an address book application on the device for accessing stored contact information. A user can alternatively invoke particular functionality in other ways including, for example, using one of user-selectable menus 109 included in the user interface.

Once an application has been selected, one or more windows or pages corresponding to the application can be displayed on display 102 of device 100. A user can navigate through the windows or pages by touching appropriate places on display 102. For example, window 104 corresponds to an e-mail application. The user can interact with the window using touch input much as the user would interact with the window using mouse or keyboard input. For example, the user can navigate through various folders in the e-mail application by touching one of user selectable controls 110 corresponding to the folders listed in window 104. As another example, a user can specify that he or she wishes to reply, forward, or delete the current e-mail by touching one of user-selectable controls 112 on the display.

Accessibility Concerns

Touch-sensitive display 102 of device 100 can be difficult for a user with disabilities, for example, a user who is visually impaired, to navigate. The display provides little useful feedback to help a user navigate the presented content or to know when input to the device is needed.

In some implementations, device 100 is configured to provide accessible information about the content on the display to a user. For example, device 100 can be configured to provide information on the display (e.g., aural feedback including synthesized speech and sound effects, haptic feedback including vibration and device motion, Braille feedback, or other feedback accessible to the user) to a visually impaired user. When the user touches or otherwise selects a particular location on the display, device 100 can provide feedback describing the contents of the display at the particular location. For example, if a user touches the display near area 114, device 100 could present content corresponding to the text "To: Me@Me.com" to the user. As another example, if a user touches the display near user interface item 106, the device could present content describing the user interface item 106, or the fact that selecting user interface item 106 will invoke an address book application. The user can then use a particular input to indicate that he or she wants to select user interface item 106 rather than merely being provided with information about user interface item 106.

However, merely providing accessible feedback to a user is not always sufficient. Visually impaired users may have trouble navigating the touch screen interface. For example, visually impaired users may have problems navigating a large touch screen interface that are different from problems the users have navigating smaller touch screen interfaces. These problems can include difficulty navigating a user interface with large amounts of empty space and/or large numbers of content items displayed simultaneously.

As will be described in more detail below, providing users with virtual container-based navigation and/or virtually enlarging item boundaries can make navigating a touch-screen device easier for a visually impaired user. These features can be enabled, for example, when a user provides input requesting device 100 switch to an accessibility mode.

Example Virtual Containers

Figure 2:
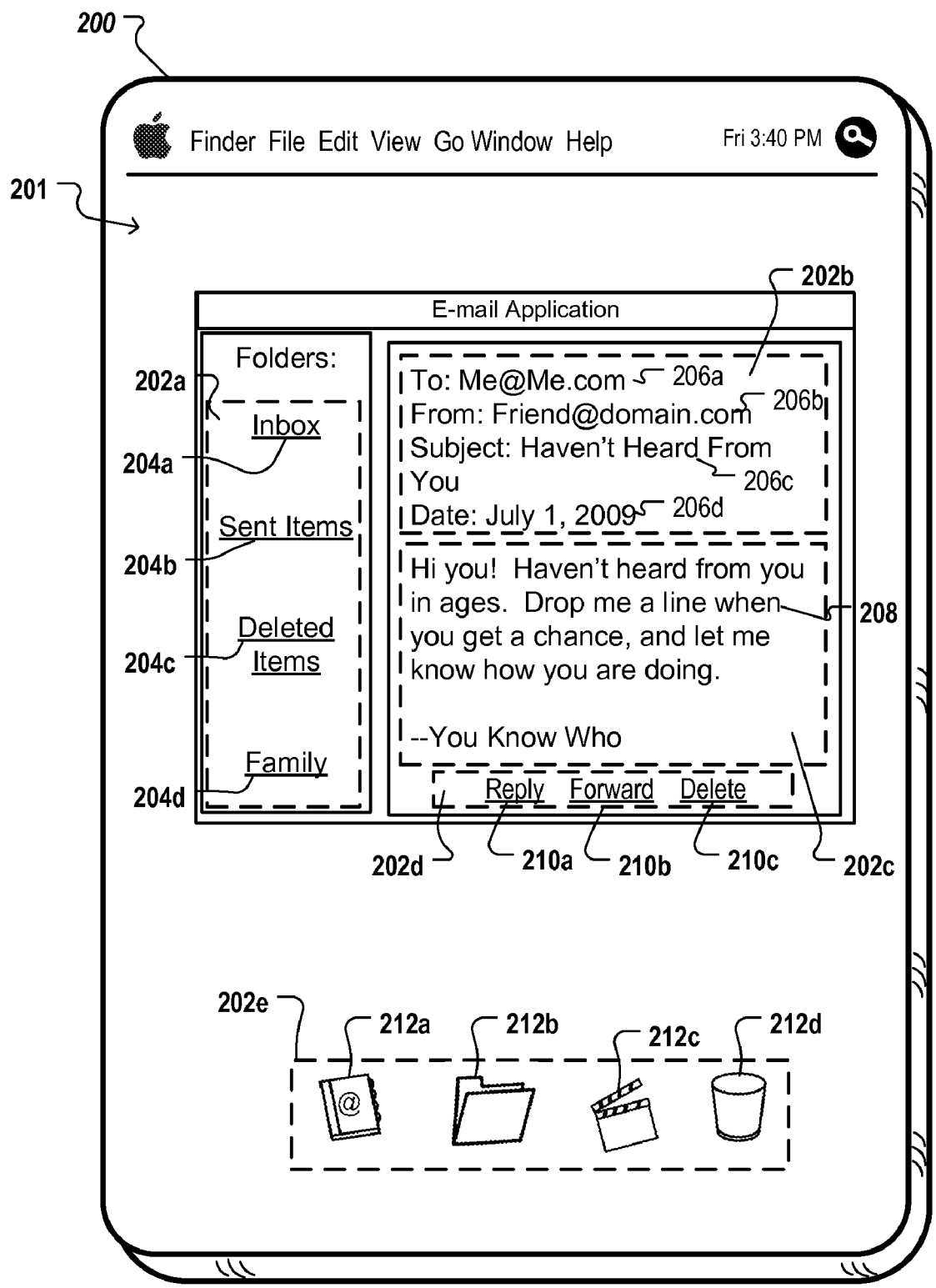
FIG. 2 illustrates an example user interface on a device.

FIG. 2 illustrates example user interface 201 on a device 200. Also illustrated on user interface 201 are virtual containers (e.g., containers 202a, 202b, 202c, 202d, and 202e). The virtual containers are shown on user interface 201 for illustrative purposes only; they are maintained by device 200 but are not generally visually demarcated on the user interface shown to a user. As will be described below, a device uses these virtual containers to help users navigate a touch-screen device.

Each virtual container 202 corresponds to a region on user interface 201. Each region includes one or more items. For example, container 202a corresponds to a listing of folders for an e-mail application. Container 202a contains four items (e.g., items 204a, 204b, 204c, and 204d). Each item 204 is a user-selectable control, that when selected by a user, causes a different folder to be displayed. Container 202b contains four items (206a, 206b, 206c, and 206d). Each item 206 corresponds to specific information about the e-mail displayed in the e-mail application. For example, the item 206a corresponds to the "to" information for the e-mail ("To: Me@Me.com"). Container 202c contains one item 208 corresponding to the text of the e-mail. Container 202d contains three entries 210a, 210b, and 210c each corresponding to a user-selectable control that causes the device to perform a different action with respect to the displayed e-mail. Container 202e contains four items (212a, 212b, 212c, and 212d).

Each item 212 is a user-selectable icon that, when selected by a user, causes a particular application to execute on device 200.

The virtual containers can be defined according to different criteria. In some implementations, the virtual containers are defined by one or more software developers that developed the applications generating content for display in the user interface. For example, the developer of the e-mail application shown in FIG. 2 can specify one or more containers appropriate to the e-mail application. Alternatively or additionally, the containers can be defined according to user interface elements that control how the user interface is displayed. In general, a container is defined where similar items are visually grouped together and occupy a distinct region of the space on the screen of the device. For example, if an application includes a table user interface element, a virtual container corresponding to the table user interface element can be defined. Other example user interface elements that can be used to define containers include toolbars, navigation bars, groups of playback controls (e.g., play, pause, track position, etc.), and frames in a web page.

The items in each container can be logically ordered. Various ordering conventions can be used. For example, the items can be ordered according to their physical location on the screen. For example, a Cartesian ordering can be used, where items that appear more at the top left of the screen can be ordered before items that appear more to the bottom right of the screen. As another example, the items in the container can be ordered according to an order assigned by the source code used to generate the user interface. For example, if the source code lists the items in a particular order, that order can be preserved. As another example, the items in the container can be ordered according to a document object model corresponding to the content being displayed. Other conventions for defining an order can also be used. The containers can also be ordered, for example, according to their physical location on the screen. For example, a Cartesian ordering system can be used.

Device 200 can use the virtual containers to aid visually disabled users in several ways. For example, one problem that users often have is that, when things are close together on the screen of the user interface, it is easy to touch one item on the screen while actually intending to touch another item. For example, a user could be reading the text of the e-mail in container 202c, and then run his or her finger onto reply control 210a in container 202d. The device can address this problem by providing feedback (e.g., aural or tactile feedback that can be perceived by a visually disabled user) when the user moves between virtual containers.

Device 200 can also use the virtual containers to help users move between items in containers. Often, containers are fairly large and contain a lot of empty space in addition to the items in the containers. This space can make it difficult for a visually disabled user to find a particular item of interest. Device 200 can help a user navigate between items in a container, for example, by automatically moving from one item in a container to another item in the container when a particular input is received from a user. When a user moves to a particular item in the container, information about that item is presented to the user, for example, in a format accessible to the user.

For example, a user may enter one input to select the container, and additional inputs to move to the first item in the container (e.g., a four finger flick left) or the last item in the container (e.g., a four finger flick right). If a user is already on the first item in a container when he or she provides the input to move to the first item in the container, the user can be presented with information about the first item in the previous container. Similarly, if a user is already on the last item in a container when he or she provides the input to move to the last item in the container, the user can be presented with information about the first item in the next container.

A user can also use inputs to move to the next item (e.g., a single finger flick right) or the previous item (e.g., a single finger flick left). If there is a next (or previous) item in the current container, the user is presented with information about that next (or previous) item. Otherwise, the user is presented with information about the first item in the next container (or the last item in the previous container).

For example, a user could touch inside container 202a, use a particular input (e.g., a particular gesture input) to navigate to the first item in the container (e.g., item 204a), and then use a different input (e.g., a different gesture input) to move to the next item in the container (e.g., 204b). When a user touches inside container 202a, the device can provide feedback to the user identifying the container. If a user touches a particular item within the container, the device can identify both the container and the item that was touched.

A user can also use specific gesture inputs to move to the first item in the first container (e.g., a four finger flick up) or the last item in the last container (e.g., a four finger flick down).

Device 200 can also move between containers in response to user input. For example, a user can be reading text in container 202b about an e-mail and want to move to the text of the e-mail in container 202c. The user can use a particular input (e.g., a particular gesture input) to indicate that he or she wants to move to the next container in an order of the containers. Similarly, the user can indicate that he or she wants to move to the first, last, or previous container.

In some implementations, device 200 can be in a particular mode for certain container functionality to be activated. For example, in one mode, device 200 can support moving between containers and moving between items in containers. In another mode, device 200 can support alerting users when they have moved outside of a container. In yet another mode, device 200 can provide no container functionality. A user can indicate a desired mode for device 200, for example, through one or more inputs to the device.

Figure 3:
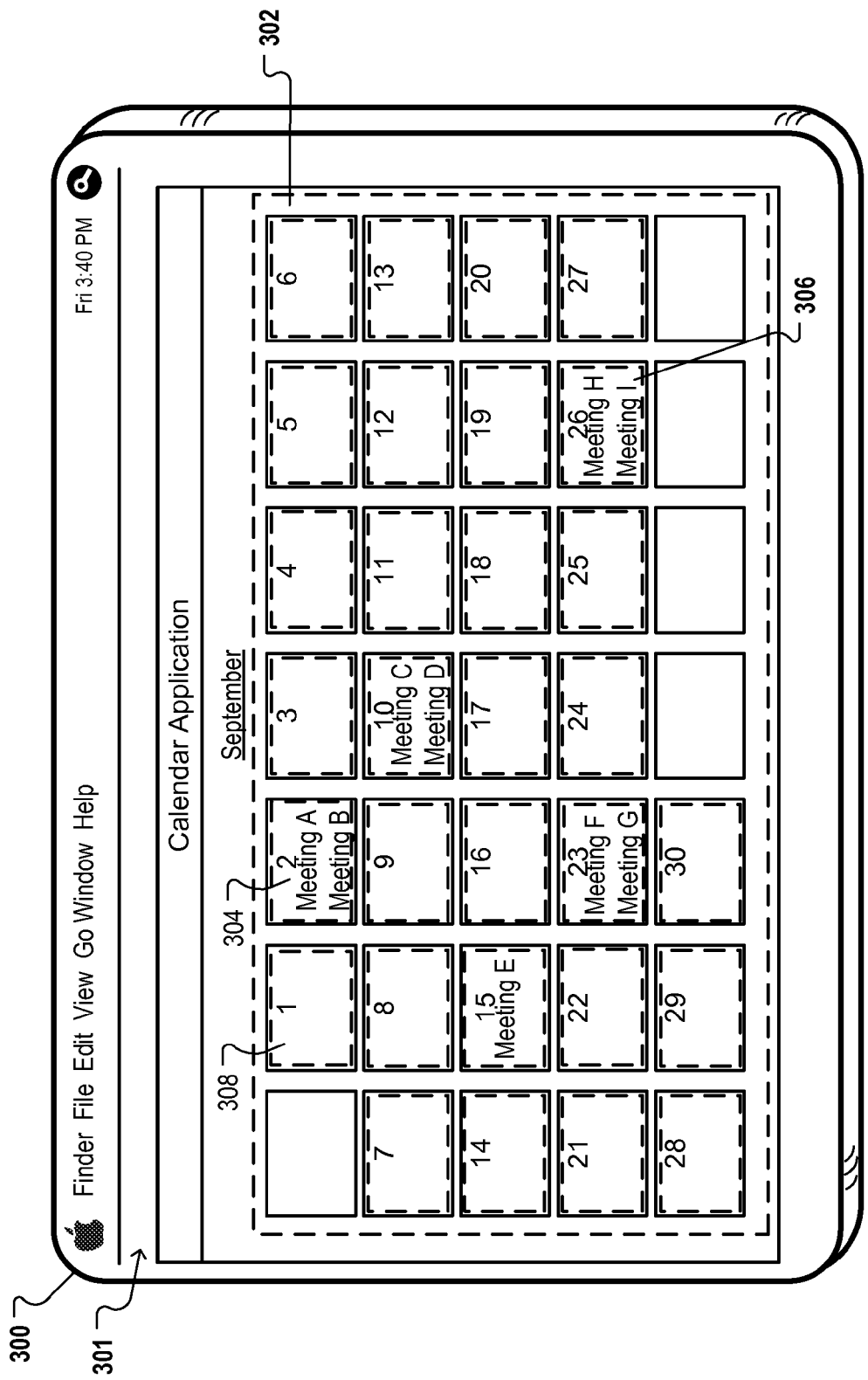
FIG. 3 illustrates an example calendar user interface displayed on device.

FIG. 3 illustrates example calendar user interface 301 displayed on device 300. Also illustrated are example virtual containers. The virtual containers include virtual container 302 corresponding to the month of September, and also include virtual containers nested within container 302 that correspond to individual dates on the calendar. For example, containers 304 and 306 each correspond to a date on the calendar.

Device 300 can use the virtual containers to help a visually disabled user navigate the user interface as follows. First, the user provides touch input within container 302. Then, the user provides touch input indicating that the first item in the container should be presented. Device 300 navigates to container 308, which is empty. The device presents content corresponding to container 308, for example, by presenting content indicating that the container corresponds to the date September 1, and that no calendar items are present. The user then provides touch input indicating that the next item should be presented. The device then navigates to container 304 and presents content corresponding to container 304. For example, the device can present content indicating that the container corresponds to the date Sep. 2, 2009, and that there are two items included in the container. The user then provides touch input indicating that the next item should be presented. The device navigates to the first item in container 304 (corresponding to Meeting A) and presents information about the item. The user then provides touch input indicating that the next item should be presented. The device navigates to the second item in container 304 (corresponding to Meeting B) and presents information about the second item.

FIGS. 2 and 3 illustrate only a few possible containers. Other containers can similarly be defined by the device anytime one or more items can be grouped together. For example, containers can be generated for groups of images, videos, and other items. As another example, icons on a conventional operating system user interface can be grouped into two containers, one corresponding to the dock and one corresponding to other icons displayed on the screen.

Example Processes Using Virtual Container Regions

Figure 4:
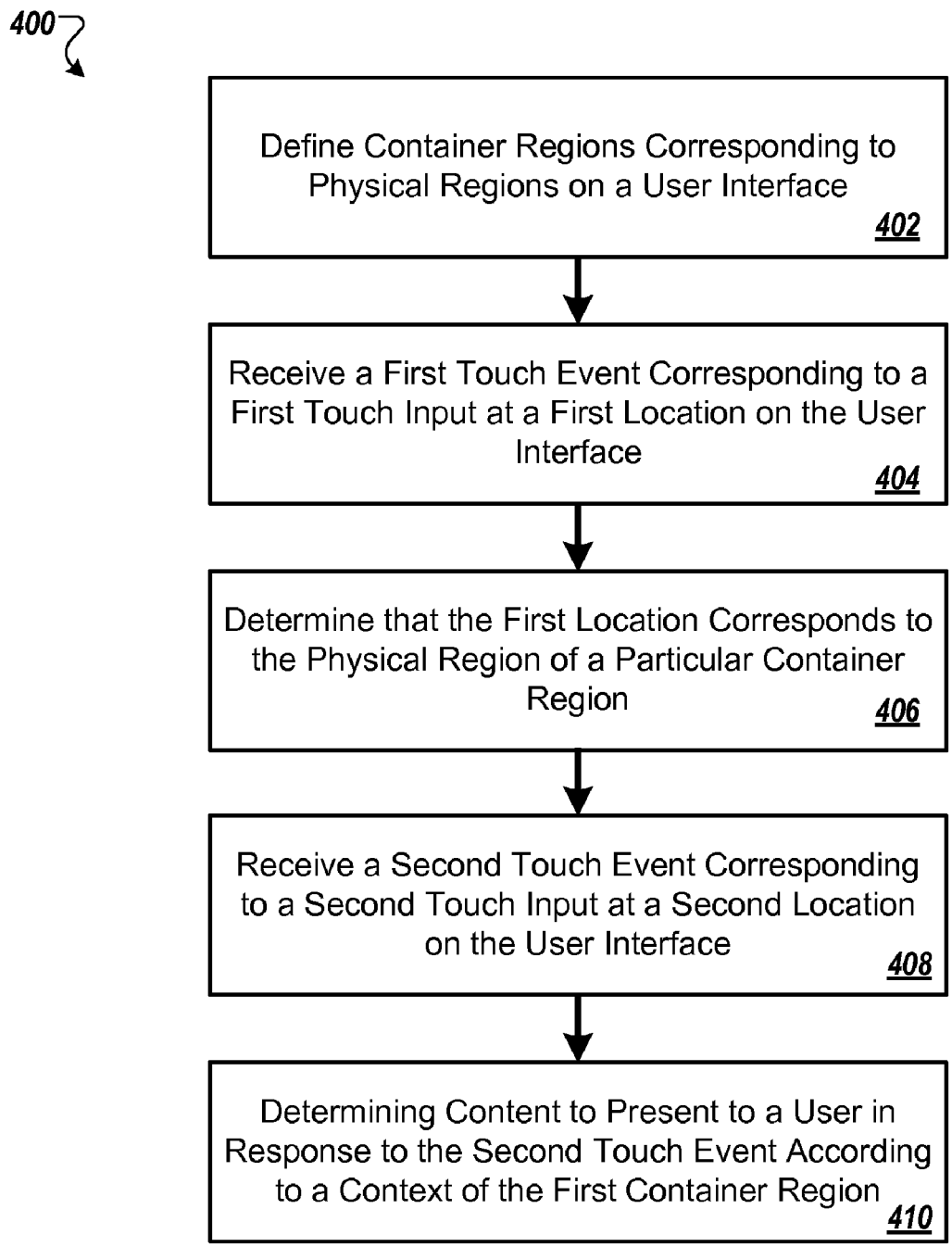
FIG. 4 is a flow diagram of an example process for processing input according to virtual container regions.

FIG. 4 is a flow diagram of example process 400 for processing input according to virtual container regions. For convenience, example process 400 will be described in reference to a system that performs process 400.

The system can define container regions corresponding to physical regions on a user interface (402). Each container region can include one or more user interface items. The system can define container regions by storing data indicating current coordinates and/or size of the container regions and/or the contents of the container regions. The coordinates of the container regions correspond to the physical location of the regions on a user interface of a user device. For example, for the user interface illustrated in FIG. 2, the system can maintain data indicating that there are four containers (202a, 202b, 202c, and 202d), data indicating the physical coordinates of each container on the user interface, and data indicating the contents of each container (e.g., container 202a contains four items in the following order: items 204a, 204b, 204c, and 204d).

The container definitions can also include additional data about the containers, for example, data defining an order for the containers, or a brief description of each container, for example, a title of each container.

The system can define container regions so that similar user interface items are displayed in each physical region corresponding to a container region. Similar user interface items are user interface items that share common properties. For example, the folders illustrated in container 202a of FIG. 2 are each user-selectable user interface items that have the same basic functionality (e.g., they cause data corresponding to their respective folders to be displayed). As another example, the e-mail header data illustrated in container 202b of FIG. 2 all corresponds to header information extracted from an e-mail message. As yet another example, the user-selectable items illustrated in container 202c of FIG. 2 are each a user-selectable item that cause a particular action to be performed on the displayed e-mail message.

The system can use various heuristics to identify the physical regions for the containers. For example, the system can apply criteria such as the ones described above with reference to FIG. 2 to identify containers and determine the boundaries of the containers. Alternatively or additionally, the system can receive data from third parties, for example, software developers, defining where containers should be relative to a particular application. For example, a software developer can use a command specified in an application programming interface to specify that a particular user interface component is a container. The developer can associate a particular attribute with the user interface component, or can call a method provided by the application programming interface to toggle the state of the component between "container" and "not container." In these implementations, the system can map the received container definitions to appropriate coordinates on the user interface.

The system can also maintain data indicating the current container (e.g., the last container selected by a user) and the current item in the container (e.g., the last item for which content was presented). This data can be used by the system, for example, as described below.

The system can receive a first touch event corresponding to a first touch input received at a first location on the user interface (404). The system can receive the first touch event, for example, from a touch service. An example touch service is described below with reference to FIG. 10.

The system can determine that the first location corresponds to the physical region of a particular container region (406). The system can determine that the input is within the physical region, for example, by comparing the coordinates of the first input (e.g., a location on the user interface corresponding to the input) to coordinates associated with container regions.

The system can receive a second touch event corresponding to a second touch input received at a second location on the user interface (408). The system can receive the second touch event, for example, from a touch service.

The system can determine content to present to a user according to a context of the first container region (410), e.g., in response to the second touch event. The context can include one or more of the user interface items in the container region, the last user interface item in the container region for which content was presented, where the container region is in an order of the container regions, and the physical boundaries of the container region. The system can determine the appropriate content to present, for example, as follows. The system can look the second input event up in a database mapping particular input events to particular actions, take the action associated with the second input, and then output content that is associated with the action.

The system can process the input independently of the location where the input was received. For example, the input can request a particular item or container relative to an order maintained by the system, and the system can identify the requested item according to the order. For example, if the requested action is to move to the a particular item (e.g., the next or previous item, or first or last item in the container), the system can do so, for example, as described below with reference to FIG. 5. As another example, if the requested action is to update the current container, the system can do so, for example, as described below with reference to FIG. 6. Once the system moves to the particular item, or particular container, the system can present content appropriate to the item or container.

Alternatively, the system can process the input based on the location where the input was received. For example, the system can alert a user when the second input is outside the first container region, as described below with reference to FIG. 7.

Figure 5:
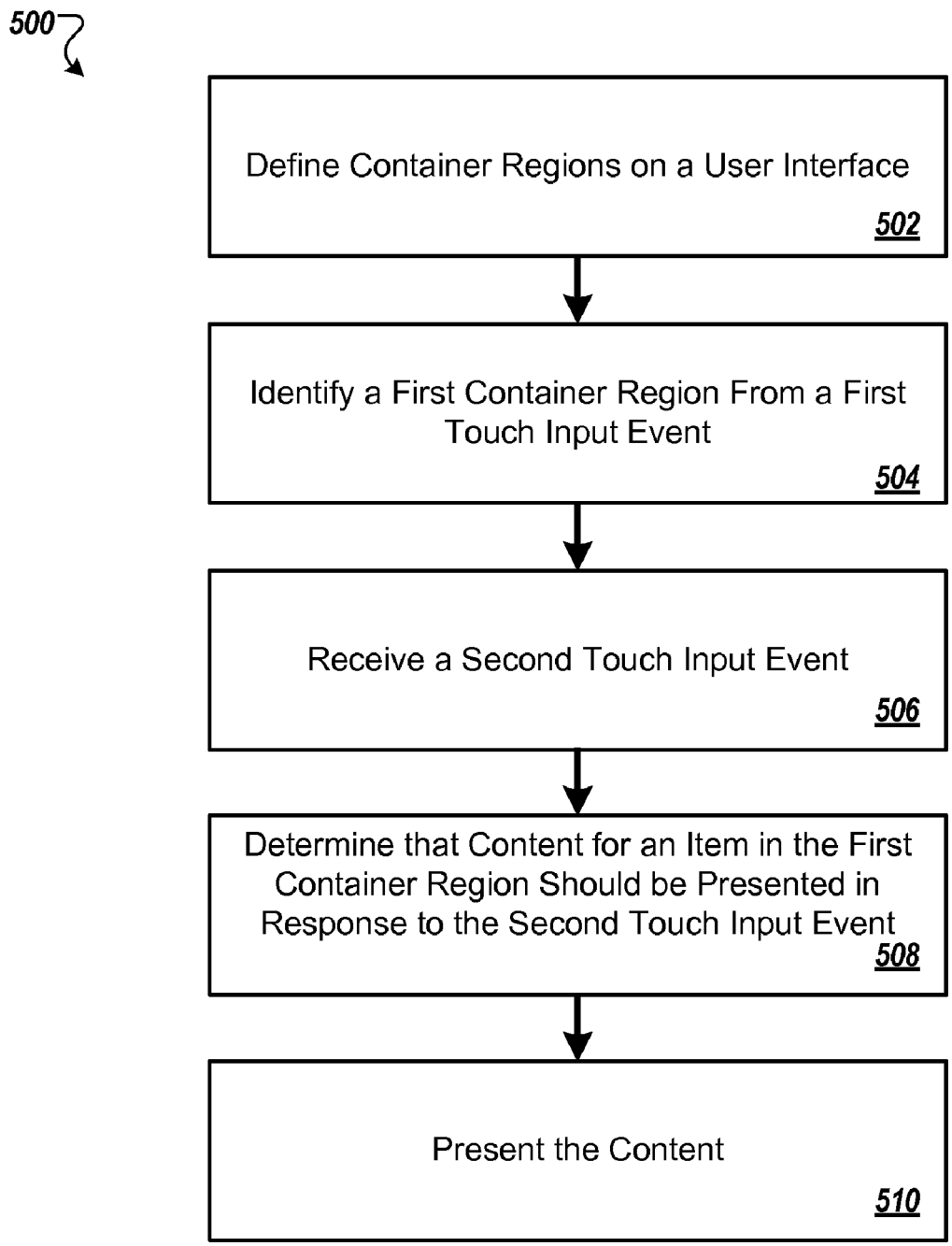
FIG. 5 is a flow diagram of an example process for identifying an item in a virtual container, and presenting content for the item.

FIG. 5 is a flow diagram of example process 500 for identifying an item in a virtual container, and presenting content for the item. For convenience, example process 500 will be described in reference to a system that performs process 500.

The system can define container regions on a user interface (502), for example, as described above with reference to FIG. 4.

The system can identify a first container region from a first touch input event (504). The system can receive the first touch input event, for example from a touch service.

The system can identify the first container region in various ways. For example, the system can receive a first touch input event within a particular container region and identify that region, as described above with reference to FIG. 5. As another example, the system can receive a first touch input event corresponding to a gesture that indicates that a particular region should be the new current container region, as described in more detail below with reference to FIG. 6.

The system can receive a second touch input event (506). The system can receive the second touch input event from a touch service. The second touch input can correspond to a gesture requesting that a particular item be presented. The particular item can be identified by a relative location in the order of the items in the container region. For example, the second touch input can be a gesture corresponding to a request that the first item in the container region be presented or that the last item in the container region be presented. As another example, the second touch input can be a gesture corresponding to a request that the next or previous item be presented. Example input gestures are described above with reference to FIG. 2.

The system can determine that content for an item in the first container region should be presented in response to the second touch input (508). The system can make this determination by identifying the item requested by the input, and then retrieving content associated with the item.

The system can identify the appropriate item in the first container region according to the order of items in the container region, the input from the user, and optionally the last item that was presented for the container and the order of the containers. For example, if the input requests the first or last item in the container, the system can identify the first or last item according to the order of items in the container. If the input requests the first item in the container, and the last item that was presented was the first item, the system can identify the first item in the previous container. If the input requests the last item in the container and the last item that was presented was the last item, the system can identify the first item in the next container.

As another example, if the input requests the next or previous item in the container, the system can identify where the last item that it presented content about is in the order, and then identify the next or previous item, as appropriate. If the last item that was presented was the first item in the container and the input requests the previous item, the system can present the last item in the previous container. Alternatively, the system can loop and present the first item in the current container. Similarly, if the last item that was presented was the last item in the container and the input requests the next item, the system can present the first item in the next container, or can loop and present the first item in the current container. The decision of whether to loop or move to the next or previous container can be made according to user preference, or can be predetermined.

The content associated with the item can be a description of the requested item. This description can include a title and/or a brief description of the item.

The system can present the content (510). The system can present the content in a manner accessible to the user, for example, haptic feedback or aural output such as synthesized speech can be used. The content can also be presented in accordance with user preferences. Example preferences can include preferences on how content is presented (e.g., one or more of volume, language, voice quality, tone, and speaking speed for aural content).

Figure 6:
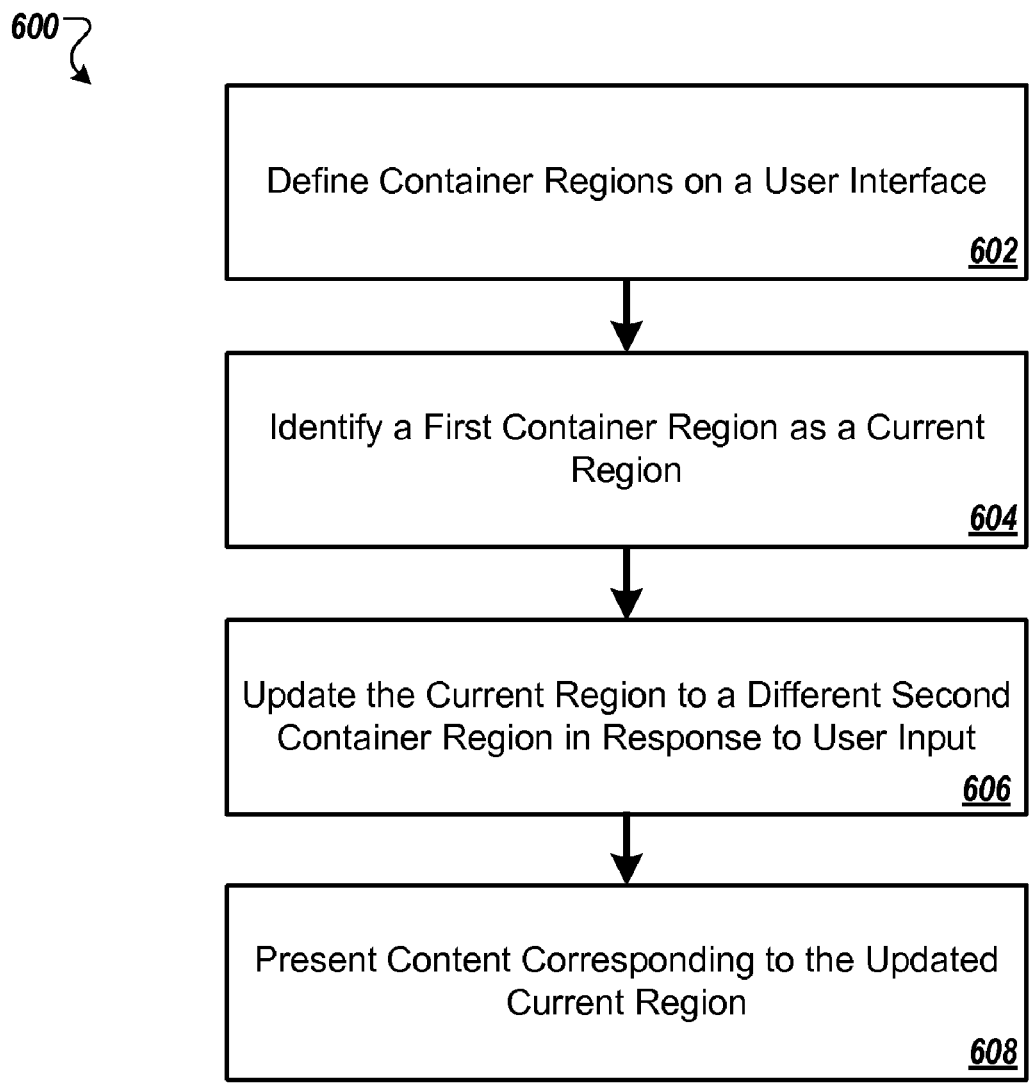
FIG. 6 is a flow diagram of an example process for updating a current container region.

FIG. 6 is a flow diagram of example process 600 for updating a current container region. For convenience, example process 600 will be described in reference to a system that performs process 600.

The system can define container regions on a user interface (602), for example, as described above with reference to FIG. 4.

The system can identify a first container region as a current region (604). The first container region can be identified according to user input, for example, as described above with reference to FIG. 5. Alternatively, the system can use stored data to identify the current region, for example, as described above with reference to FIG. 4.

The system can update the current region to a different second container region in response to user input (606), for example, by modifying data indicating the current region. The system can receive the input, for example, as a touch input event from a touch service. The touch input event can identify that a particular gesture was detected. The system can map the gesture to a particular location in the order for the containers that is requested by the user, for example, by retrieving a location associated with the gesture in a database. The system can determine the appropriate updated region according to the user input and an order for the regions. For example, if the user input requests that the system move to another container (e.g., the first or last container), the system can identify the requested container according to the order of the containers. As another example, if the user input requests that the system move to the next (or last) item in a container, but the previous item presented by the system was the last item in the container, the system can move to the next container. Similarly, if the user input requests that the system move to the previous (or first) item in a container, but the previous item presented by the system was the first item in the container, the system can move to the previous container.

The system can present content corresponding to the updated current region (608). For example, the system can present a brief description of the updated current container region. This description can include a title and/or a brief description or count of the items in the updated current container. The system can alternatively or additionally present content about one or more items in the container, for example, the first item in the container.

In some implementations, when the system updates the current container region, the system can also display a larger representation of the container region on the screen. For example, the system can enlarge the updated container region so that it is the only thing displayed on the device.

Figure 7:
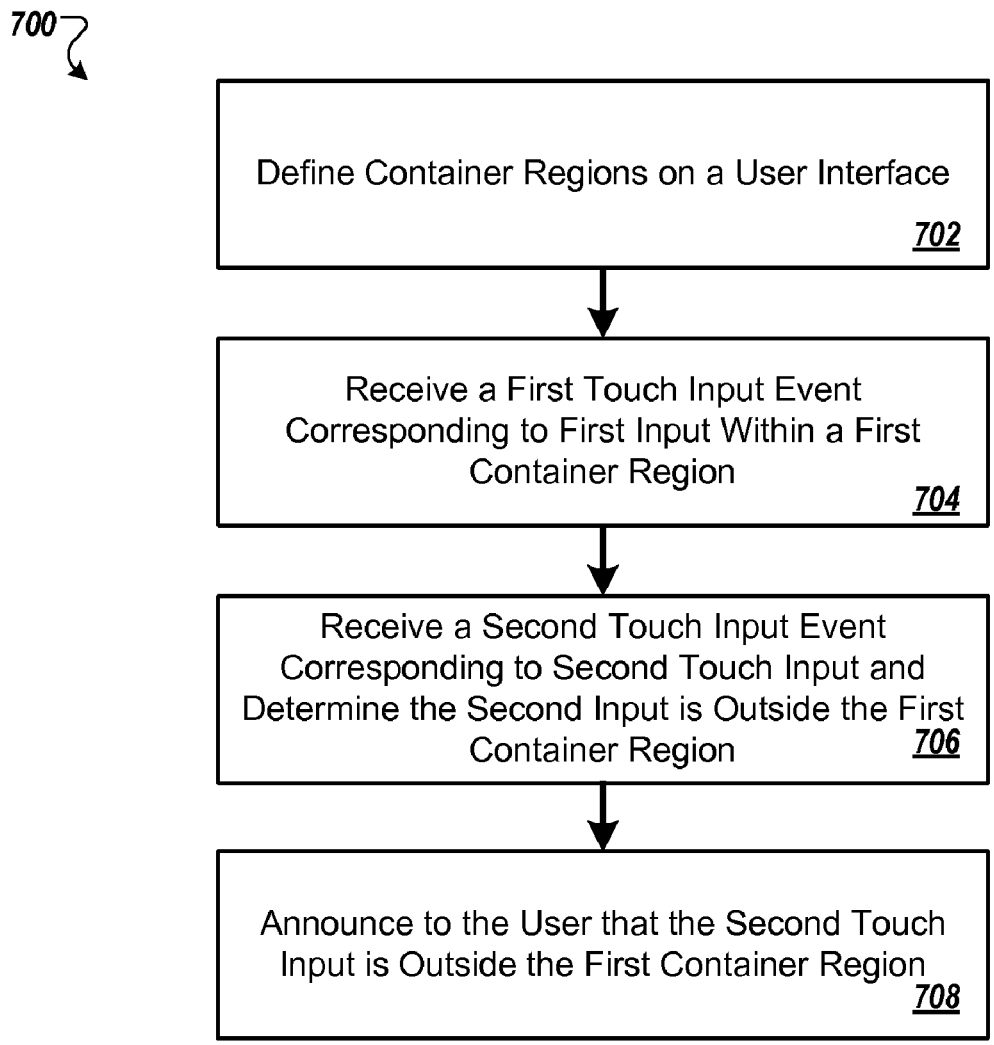
FIG. 7 is a flow diagram of example process for alerting a user when the user provides input outside a given container region.

FIG. 7 is a flow diagram of example process 700 for alerting a user when the user provides input outside a given container region. For convenience, example process 700 will be described in reference to a system that performs process 700.

The system can define container regions on a user interface (702), for example, as described above with reference to FIG. 4.

The system can receive a first touch input event corresponding to first input within a first container region (704), for example, as described above with reference to FIG. 4.

The system can receive a second touch input event corresponding to second input and can determine that the second touch input is outside the first container region (706). The system can make this determination by comparing the coordinates of the second input to the coordinates in the definition for the current container.

The system can announce to the user that the second touch input is outside the first container region (708). For example, the system can provide distinctive aural feedback (e.g., sound effects) or haptic feedback to indicate that the second input is outside the first container region.

Example Virtually-Enlarged Items

Figure 8:
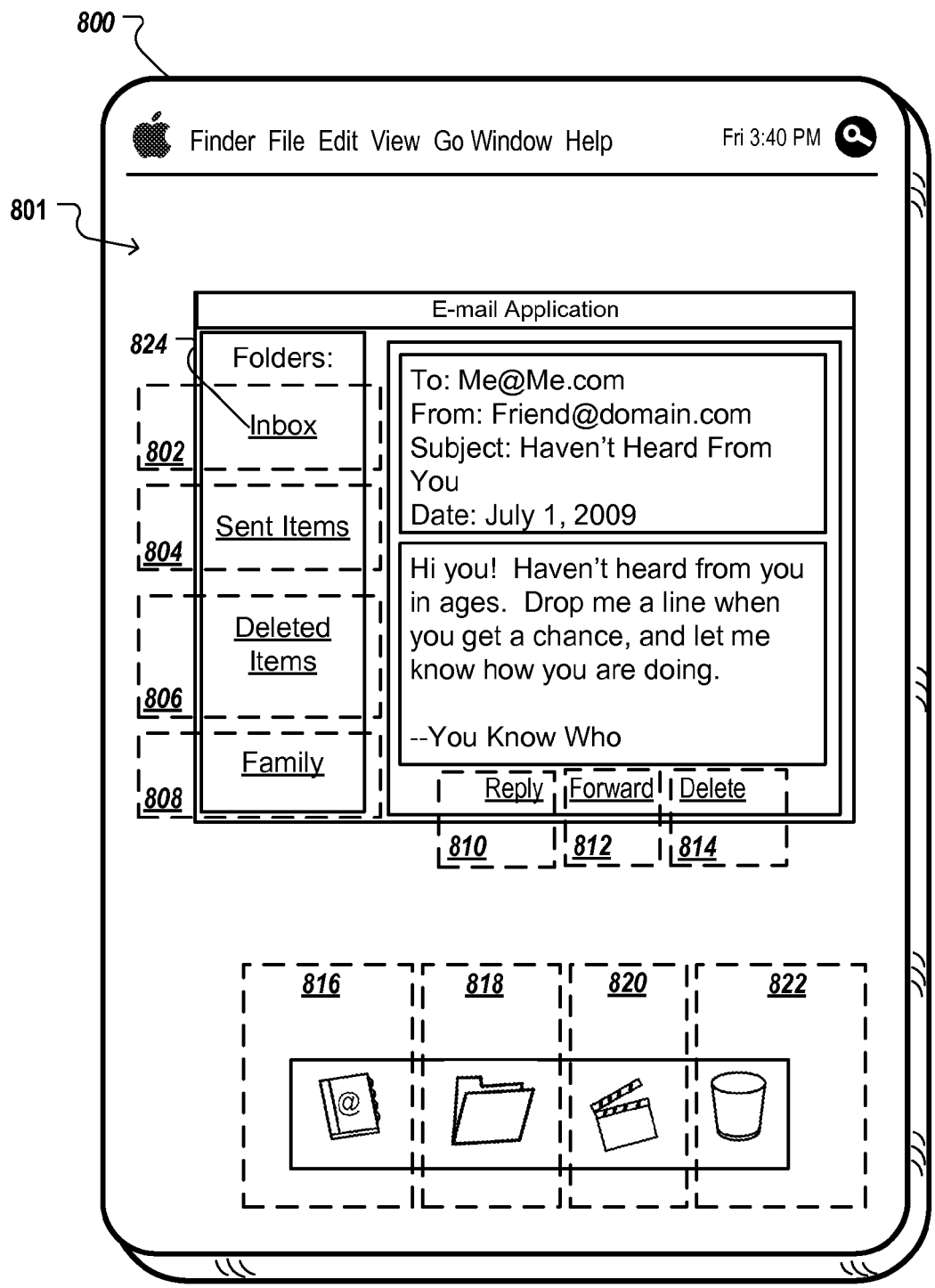
FIG. 8 illustrates an example user interface on a device.

FIG. 8 illustrates example user interface 801 on device 800. Also illustrated on user interface 801 are virtual enlarged boundaries for items presented in the user interface (e.g., virtual enlarged boundaries 802, 804, 806, 808, 810, 812, 814, 816, 818, 820, and 822). The virtual enlarged boundaries are shown on the user interface for illustrative purposes only; they are maintained by the device but are not generally visually demarcated on the user interface shown to a user. As will be described below, a device uses these virtual enlarged boundaries to help users navigate a touch-screen device.

When a user provides touch input at a particular location on user interface 801, the device can determine whether the input is within one of the virtual enlarged boundaries for an item presented in the user interface. If so, an application executing on the device can perform as if the user selected the item. For example, a user could touch at the upper left edge of the virtual enlarged boundary 802 and e-mail application would perform as if the user had actually selected the "Inbox" user selectable control 824.

Example Process for Using Virtually Enlarged Item Boundaries

Figure 9:
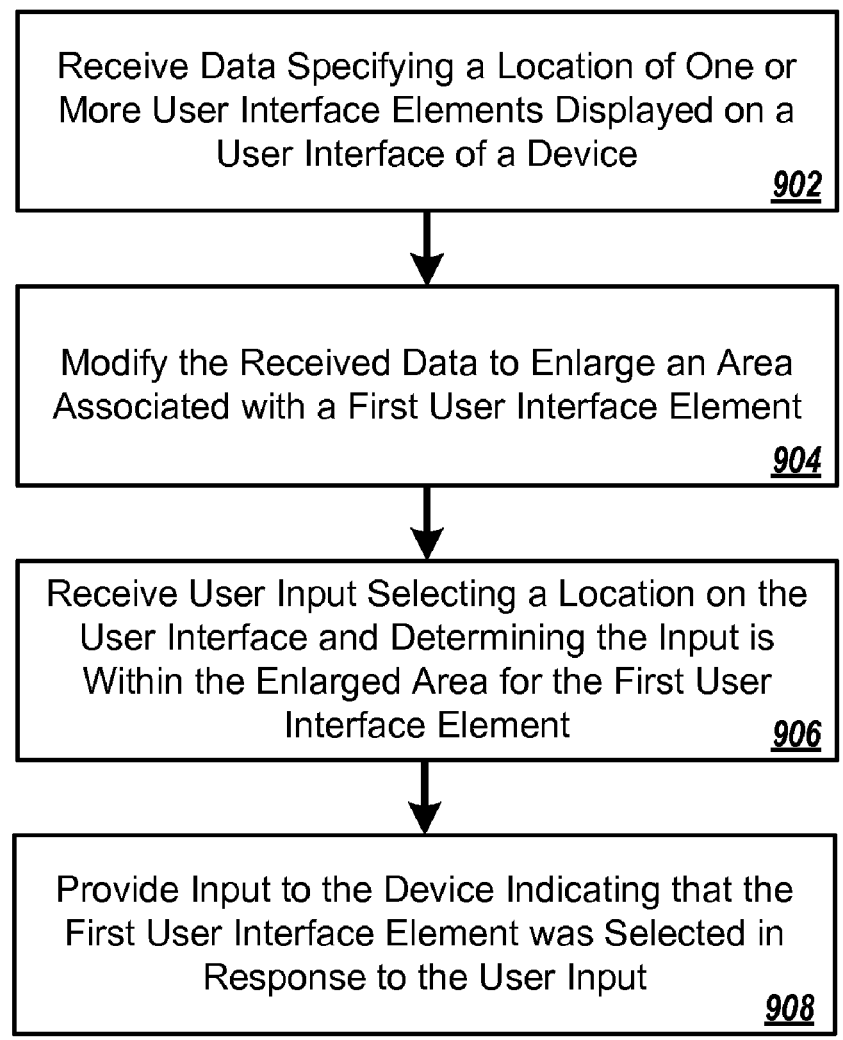
FIG. 9 is a flow diagram of an example process for using virtually enlarged item boundaries.

FIG. 9 is a flow diagram of example process 900 for using virtually enlarged item boundaries. For convenience, example process 900 will be described in reference to a system that performs process 900.

The system receives data specifying a location of one or more user interface items displayed on a user interface of a device (902). The data can be generated, for example, using conventional techniques for tracking where items are displayed on a user interface.

The data can include data identifying the boundaries of each item displayed on the user interface. For example, the data can specify the four corners of a rectangle that makes up the boundary of the item.

The system modifies the received data to enlarge an area associated with a first user interface item (904). This modification expands the boundaries associated with the first user interface item, in effect, creating a virtual boundary for the user interface item. The modified boundary can be selected so that it does not overlap with the boundaries for any of the other user interface items.

In some implementations, the system can first determine whether the boundaries for the item should be enlarged. To do this, the system can consider whether the amount of empty space (e.g., free from other user interface items) around the item in one or more directions satisfies a threshold. The threshold can be a predetermined threshold or can be dynamic. For example, the threshold can be a percentage of the size of the largest, smallest, or average user interface window displayed on the device at a current time. Alternatively, or additionally, the system can determine that the boundaries for an item should be enlarged according to certain properties for the item. Some items can be identified as needing enlargement, for example, at the time they are created.

The system can use various heuristics to determine how to modify the boundaries associated with the user interface item.

In some implementations, the system determines an amount of empty space around the user interface item in one or more directions on the user interface. The system can then enlarge the boundary in a given direction by an amount derived from the amount of empty space in the direction. For example, the system can multiply the amount of empty space by a scaling factor (e.g., ⅓), or can subtract a constant value from the amount of empty space. Alternatively, the system can enlarge the boundary by the same amount in each direction; e.g., by determining a possible enlargement amount for each direction as described above, and then enlarging the boundary in each direction by the smallest determined enlargement amount.

In some implementations, the system uses a predefined enlargement amount. The predefined enlargement amount can be specific to the type of user interface item. For example, icons in a dock can have one enlargement amount, and hyperlinks in a webpage can have a different enlargement amount. In some implementations, the system can modify the predefined enlargement amount, for example, to prevent overlap between the enlarged boundary and a boundary for another item.

In some implementations, when the item is included within a particular user interface component (e.g., text inside a cell of a table), the system expands the item to the size of the user interface component. For example, the system could expand text to have the same height as the cell of the table and/or the same width as the cell of the table.

The system receives a touch input event corresponding to touch input at a location on the user interface and determines that the touch input is within the enlarged area for the first user interface item (906). The system can receive the touch input event as an input event from a touch service. An example touch service is described below with reference to FIG. 10.

The system can determine whether the user has selected an item on the user interface as follows. First, the system determines a location on the screen indicated by the input. Then, the system compares the location to the boundaries indicated by the modified data.

The system provides input to an application on the device indicating that the first user interface item was selected (908), e.g., in response to the user input.

In some implementations, the system modifies the boundaries for multiple items in response to a triggering event. For example, if the system receives a touch event within a container region, the system can modify the boundaries for all items in the container (and optionally revert the boundaries for any items not in the container region to their original values.

Example Software Architecture

Figure 10:
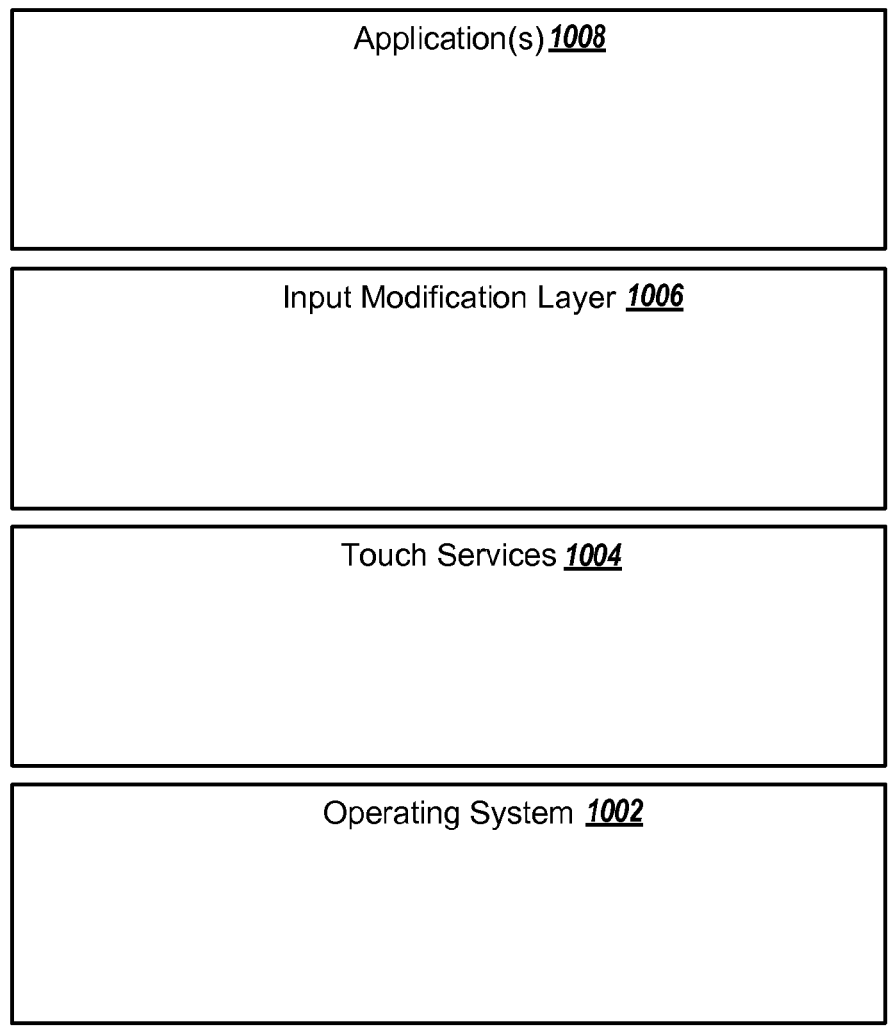
FIG. 10 illustrates an example software architecture for increasing device accessibility.

FIG. 10 illustrates example software architecture 1000 for increasing device accessibility. Example software architecture 1000 can be used to implement the methods described above with reference to FIGS. 4-7 and 9.

Software architecture 1000 can include operating system 1002, touch services module 1004, input modification layer 1006, and application(s) 1008. This architecture can conceptually operate on top of a hardware layer (not shown).

Operating system 1002 provides an interface to the hardware layer (e.g., a capacitive touch display or device). Operating system 1002 can include one or more software drivers that communicates with the hardware. For example, the drivers can receive and process touch input signals generated by a touch-sensitive display or device in the hardware layer. The operating system 1002 can process raw input data received from the driver(s). This processed input data can then made available to touch services layer 1004 through one or more application programming interfaces (APIs). These APIs can be a set of APIs that are usually included with operating systems (such as, for example, Linux or UNIX APIs), as well as APIs specific for sending and receiving data relevant to touch input.

Touch services module 1004 can receive touch inputs from operating system layer 1002 and convert one or more of these touch inputs into touch input events according to an internal touch event model.

The touch input events can be in a format (e.g., attributes) that are easier to use in an application than raw touch input signals generated by the touch-sensitive device. For example, a touch input event can include a set of coordinates for each location at which a touch is currently occurring on a user interface.

In some implementations, gesture touch input events can also be detected by combining two or more touch input events. The gesture input events can contain scale and/or rotation information. The rotation information can include a rotation value that is a relative delta in degrees. The scale information can also include a scaling value that is a relative delta in pixels on the display device. Other gesture events are possible.

All or some of these touch input events can be made available to developers through a touch input event API. The touch input API can be made available to developers as a Software Development Kit (SDK) or as part of an application (e.g., as part of a browser tool kit).

The input modification layer 1006 receives input from the touch services layer and processes the input according to virtual containers and/or virtual enlargement of user interface items, for example, as described above with reference to FIGS. 2-7. The input modification layer then provides instruction events to one or more applications. The applications can access these instruction events through an API.

The application(s) 1008 receive instruction events from the input modification layer and take appropriate action based on the contents of the instruction events.

Example Device Architecture

Figure 11:
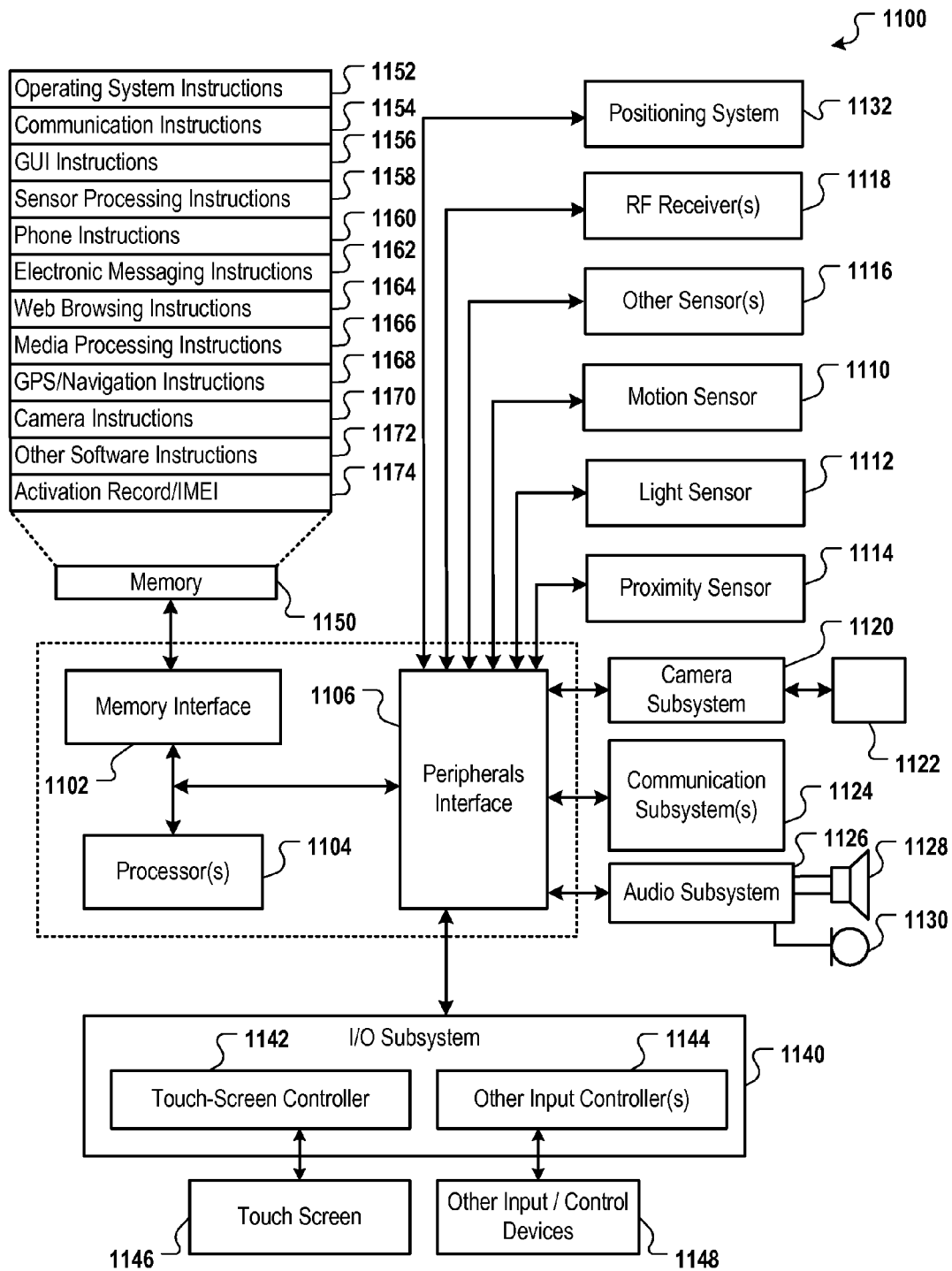
FIG. 11 is a block diagram of an example hardware architecture of a device with increased accessibility.

FIG. 11 is a block diagram of an example hardware architecture of device 1000 with increased accessibility. Device 1100 can include memory interface 1102, one or more data processors, image processors and/or central processing units 1104, and peripherals interface 1106. Memory interface 1102, one or more processors 1104 and/or peripherals interface 1106 can be separate components or can be integrated in one or more integrated circuits. The various components in device 1100 can be coupled by one or more communication buses or signal lines.

Sensors, devices, and subsystems can be coupled to the peripherals interface 1106 to facilitate multiple functionalities. For example, motion sensor 1110, light sensor 1112, and proximity sensor 1114 can be coupled to peripherals interface 1106 to facilitate various orientation, lighting, and proximity functions. For example, in some implementations, light sensor 1112 can be utilized to facilitate adjusting the brightness of touch screen 1146. In some implementations, motion sensor 1110 (e.g., an accelerometer, velicometer, or gyroscope) can be utilized to detect movement of the device. Accordingly, user interface items and/or media can be presented according to a detected orientation, e.g., portrait or landscape.

Other sensors 1116 can also be connected to peripherals interface 1106, such as a temperature sensor, a biometric sensor, or other sensing device, to facilitate related functionalities.

Location determination functionality can be facilitated through positioning system 1132. Positioning system 1132, in various implementations, can be a component internal to device 1100, or can be an external component coupled to device 1100 (e.g., using a wired connection or a wireless connection). In some implementations, positioning system 1132 can include a GPS receiver and a positioning engine operable to derive positioning information from received GPS satellite signals. In other implementations, positioning system 1132 can include a compass (e.g., a magnetic compass) and an accelerometer, as well as a positioning engine operable to derive positioning information based on dead reckoning techniques. In still further implementations, positioning system 1132 can use wireless signals (e.g., cellular signals, IEEE 802.11 signals) to determine location information associated with the device. Other positioning systems are possible.

Broadcast reception functions can be facilitated through one or more radio frequency (RF) receiver(s) 1118. An RF receiver can receive, for example, AM/FM broadcasts or satellite broadcasts (e.g., XM® or Sirius® radio broadcast). An RF receiver can also be a TV tuner. In some implementations, RF receiver 1118 is built into wireless communication subsystems 1124. In other implementations, RF receiver 1118 is an independent subsystem coupled to device 1100 (e.g., using a wired connection or a wireless connection). RF receiver 1118 can receive simulcasts. In some implementations, RF receiver 1118 can include a Radio Data System (RDS) processor, which can process broadcast content and simulcast data (e.g., RDS data). In some implementations, RF receiver 1118 can be digitally tuned to receive broadcasts at various frequencies. In addition, RF receiver 1118 can include a scanning function which tunes up or down and pauses at a next frequency where broadcast content is available.

Camera subsystem 1120 and optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 1124. Communication subsystem(s) can include one or more wireless communication subsystems and one or more wired communication subsystems. Wireless communication subsystems can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving and/or transmitting data. The specific design and implementation of communication subsystem 1124 can depend on the communication network(s) or medium(s) over which device 1100 is intended to operate. For example, device 1100 may include wireless communication subsystems designed to operate over a global system for mobile communications (GSM) network, a GPRS network, an enhanced data GSM environment (EDGE) network, 802.x communication networks (e.g., Wi-Fi, WiMax, or 3G networks), code division multiple access (CDMA) networks, and a Bluetooth™ network. Communication subsystems 1124 may include hosting protocols such that device 1100 may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 1126 can be coupled to speaker 1128 and one or more microphones 1130. One or more microphones 1130 can be used, for example, to facilitate voice-enabled functions, such as voice recognition, voice replication, digital recording, and telephony functions.

I/O subsystem 1140 can include touch screen controller 1142 and/or other input controller(s) 1144. Touch-screen controller 1142 can be coupled to touch screen 1146. Touch screen 1146 and touch screen controller 1142 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch screen 1146 or proximity to touch screen 1146.

Other input controller(s) 1144 can be coupled to other input/control devices 1148, such as one or more buttons, rocker switches, thumb-wheel, infrared port, USB port, and/or a pointer device such as a stylus. The one or more buttons (not shown) can include an up/down button for volume control of speaker 1128 and/or microphone 1130.

In one implementation, a pressing of the button for a first duration may disengage a lock of touch screen 1146; and a pressing of the button for a second duration that is longer than the first duration may turn power to device 1100 on or off. The user may be able to customize a functionality of one or more of the buttons. Touch screen 1146 can, for example, also be used to implement virtual or soft buttons and/or a keyboard.

In some implementations, device 1100 can present recorded audio and/or video files, such as MP3, AAC, and MPEG files. In some implementations, device 1100 can include the functionality of an MP3 player, such as an iPhone™.

Memory interface 1102 can be coupled to memory 1150. Memory 1150 can include high-speed random access memory and/or non-volatile memory, such as one or more magnetic disk storage devices, one or more optical storage devices, and/or flash memory (e.g., NAND, NOR). Memory 1150 can store an operating system 1152, such as Darwin, RTXC, LINUX, UNIX, OS X, WINDOWS, or an embedded operating system such as VxWorks. Operating system 1152 may include instructions for handling basic system services and for performing hardware dependent tasks. In some implementations, the operating system 1152 can be a kernel (e.g., UNIX kernel).

Memory 1150 may also store communication instructions 1154 to facilitate communicating with one or more additional devices, one or more computers and/or one or more servers. Communication instructions 1154 can also be used to select an operational mode or communication medium for use by the device, based on a geographic location (obtained by the GPS/Navigation instructions 1168) of the device. Memory 1150 may include graphical user interface instructions 1156 to facilitate graphic user interface processing; sensor processing instructions 1158 to facilitate sensor-related processing and functions (e.g., the touch services module 804 described above with reference to FIG. 8); phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GPS/Navigation instructions 1168 to facilitate GPS and navigation-related processes and instructions, e.g., mapping a target location; camera instructions 1170 to facilitate camera-related processes and functions; and/or other software instructions 1172 to facilitate other processes and functions, such as the, accessibility features and processes described with reference to FIGS. 1-9. Memory 1150 may also store other software instructions (not shown), such as web video instructions to facilitate web video-related processes and functions; and/or web shopping instructions to facilitate web shopping-related processes and functions. In some implementations, media processing instructions 1166 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 1150 can include additional instructions or fewer instructions. Furthermore, various functions of device 1100 may be implemented in hardware and/or in software, including in one or more signal processing and/or application specific integrated circuits.

Example Network Operating Environment for a Device

Figure 12:
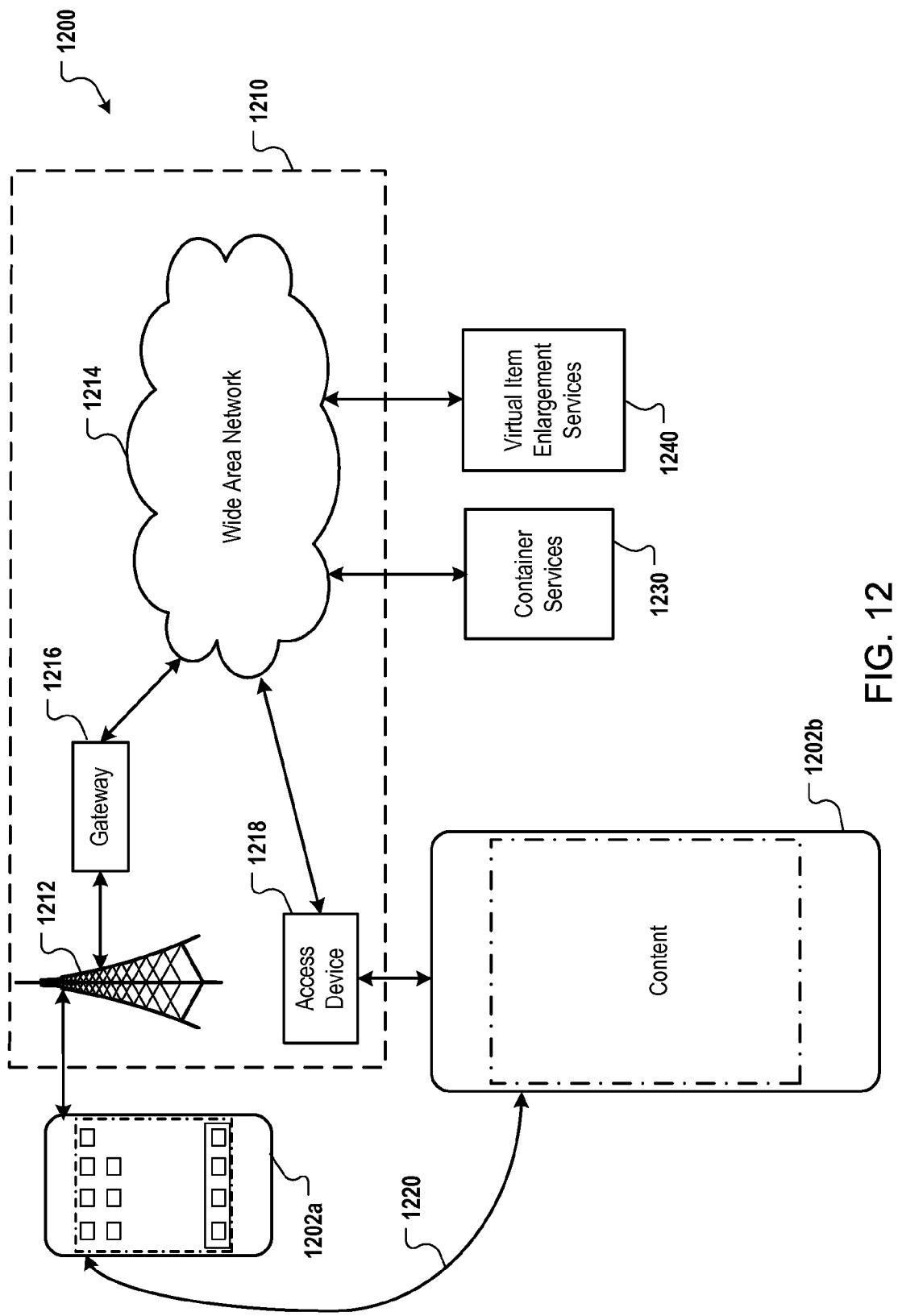
FIG. 12 is a block diagram of an example network operating environment for a device with increased accessibility.

FIG. 12 is a block diagram of example network operating environment 1200 for a device with increased accessibility. Devices 1202a and 1202b can, for example, communicate over one or more wired and/or wireless networks 1210 in data communication. For example, wireless network 1212, e.g., a cellular network, can communicate with wide area network (WAN) 1214, such as the Internet, by use of gateway 1216. Likewise, access device 1218, such as an 802.11g wireless access device, can provide communication access to wide area network 1214. In some implementations, both voice and data communications can be established over wireless network 1212 and access device 1218. For example, device 1202a can place and receive phone calls (e.g., using VoIP protocols), send and receive e-mail messages (e.g., using POP3 protocol), and retrieve electronic documents and/or streams, such as web pages, photographs, and videos, over wireless network 1212, gateway 1216, and wide area network 1214 (e.g., using TCP/IP or UDP protocols). Likewise, in some implementations, device 1202b can place and receive phone calls, send and receive e-mail messages, and retrieve electronic documents over access device 1218 and wide area network 1214. In some implementations, devices 1202a or 1202b can be physically connected to access device 1218 using one or more cables and access device 1218 can be a personal computer. In this configuration, device 1202a or 1202b can be referred to as a "tethered" device.

Devices 1202a and 1202b can also establish communications by other means. For example, wireless device 1202a can communicate with other wireless devices, e.g., other devices 1202a or 1202b, cell phones, etc., over the wireless network 1212. Likewise, devices 1202a and 1202b can establish peer-to-peer communications 1220, e.g., a personal area network, by use of one or more communication subsystems, such as a Bluetooth™ communication device. Other communication protocols and topologies can also be implemented.

Devices 1202a or 1202b can, for example, communicate with one or more services over the one or more wired and/or wireless networks 1210. These services can include, for example, container services 1230 and virtual item enlargement services 1240. Container services 1230 can manage the definition and use of virtual containers, for example, as described above with reference to FIGS. 2-7. Virtual item enlargement services can manage the virtual enlargement of user interface items, for example, as described above with reference to FIGS. 8-9.

Device 1202a or 1202b can also access other data and content over the one or more wired and/or wireless networks 1210. For example, content publishers, such as news sites, RSS feeds, web sites, blogs, social networking sites, developer networks, etc., can be accessed by device 1202a or 1202b. Such access can be provided by invocation of a web browsing function or application (e.g., a browser) in response to a user touching, for example, a Web object.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively, or in addition, the program instructions can be encoded on a propagated signal that is an artificially generated signal, e.g., a machine-generated electrical, optical, or electromagnetic signal, that is generated to encode information for transmission to a suitable receiver apparatus for execution by a programmable processor.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:
1. A computer-implemented method, comprising:
while in an accessibility mode distinct from a normal mode of operation, performing operations including:
defining a plurality of container regions, each container region corresponding to a physical region on a touch-sensitive user interface of a device, the physical region defined so that one or more similar user interface items are displayed in the physical region on the touch-sensitive user interface;
receiving a first touch input at a first location on the user interface;

determining that the first location corresponds to the physical region of a first container region in the plurality of container regions;

receiving a second touch input at a second location on the user interface; and in response to the second touch input, determining content to present to a user according to a context of the first container region and independent of the second location.

2. The method of claim 1, further comprising presenting the content using a haptic or an aural presentation.

3. The method of claim 1, wherein:

the first container region includes one or more first user interface items having an order;

the second input identifies a desired location of an item relative to the order; and determining content to present includes identifying a particular first user interface item at the desired location relative to the order and obtaining content describing the particular first user interface item.

4. The method of claim 1, wherein:

the container regions have an associated order;

the second input identifies a desired location of a container region relative to the order; and determining content to present includes identifying a second container region at the desired location and obtaining content describing the second container region.

5. The method of claim 4, wherein the second input corresponds to a request for one of: a last container region in the order, a first container region in the order, a next container region in the order, or a previous container region in the order.

6. The method of claim 4, further comprising:

storing data identifying the first container region as a current container in response to the first input; and updating the stored data to identify the second container region as the current container in response to the second input.

7. The method of claim 4, wherein the content describing the second container region is content for an item included in the second container region.

8. A computer-implemented method, comprising:

displaying a plurality of user interface items;

defining a plurality of container regions, each container region corresponding to a physical region on a touch-sensitive user interface of a device, each region defined so that one or more user interface items are displayed in the physical region on the touch-sensitive user interface, wherein the plurality of container regions have an order and the one or more user interface items in each container region have an order;

storing data identifying a current container region;

while displaying the plurality of user interface items:

receiving a first gesture input;

determining that the first gesture input corresponds to a request to update the current container region to a new container region identified according to a position in the order for the container regions, and then updating the current container region to be the new container region; and receiving a second gesture input;

determining that the second gesture input corresponds to a request to present content corresponding to a particular user interface item in the current container region identified according to a position in the order for the one or more user interface items in the current container region; and presenting content corresponding to the particular user interface item in response to the second gesture input.

9. The method of claim 8, wherein the first gesture input requests one of a first item in the order for the container regions or a last item in the order for the container regions.

10. The method of claim 8, further comprising, after receiving the second gesture, storing data indicating a current item in the current container region, wherein:

the current item in the current container region is a first item in an order of items for the current container region;

the first gesture input corresponds to a request to present either the first item in the order of items for the current container region or a previous item in the order of items for the current container region; and the new container region is a previous container region in the order for the container regions.

11. The method of claim 8, further comprising, after receiving the second gesture, storing data indicating a current item in the current container region, wherein:

the current item in the current container region is a last item in an order of items for the current container region;

the first gesture input corresponds to a request to present either the last item in the order of items for the current container region or a next item in the order of items for the current container region; and the new container region is a next container region in the order for the container regions.

12. The method of claim 8, further comprising:

receiving a third gesture input;

determining that the third gesture input corresponds to a request to present content corresponding to another user interface item in the updated current container region; and presenting content corresponding to the other user interface item in response to the third gesture input.

13. The method of claim 12, further comprising storing data identifying the particular user interface item as a current user interface item for the current region, wherein the third gesture input corresponds to a request for a previous or next user interface item relative to the current user interface item in the order for the updated current container region.

14. The method of claim 12, wherein the third gesture input corresponds to a request for a first or last user interface item in the order for the updated current container region.

15. The method of claim 8, further comprising presenting content describing the new container region in response to updating the current container region.

16. The method of claim 8, wherein presenting the content includes presenting the item according to one or more preferences of a user.

17. The method of claim 8, wherein presenting the content includes presenting content using a haptic or an aural presentation.

18. The method of claim 16, wherein the aural presentation includes synthetic speech.

19. An apparatus comprising:

a touch-sensitive user interface;

a processor; and a computer storage medium storing instructions, that when executed by the processor, cause the processor to perform operations comprising:

displaying a plurality of user interface items;

defining a plurality of container regions, each container region corresponding to a physical region on the touch-sensitive user interface, the physical region defined so that one or more user interface items are displayed in the physical region on the touch-sensitive user interface, wherein the plurality of container regions have an order and the one or more user interface items in each container region have an order;
storing data identifying a current container region;
while displaying the plurality of user interface items:
receiving a first gesture input;
determining that the first gesture input corresponds to a request to update the current container region to a new container region identified according to a position in the order for the container regions, and then updating the current container region to be the new container region; and
receiving a second a gesture input;
determining that the second gesture input corresponds to a request to present content corresponding to a particular user interface item in the current container region identified according to a position in the order for the one or more user interface items in the current container region; and
presenting content corresponding to the particular user interface item in response to the second gesture input.

20. A computer storage medium encoded with program instructions that, when executed by data processing apparatus, cause the data processing apparatus to perform operations comprising:
displaying a plurality of user interface items;
defining a plurality of container regions, each container region corresponding to a physical region on a touch-sensitive user interface of a device, each region defined so that one or more user interface items are displayed in the physical region on the touch-sensitive user interface, wherein the plurality of container regions have an order and the one or more user interface items in each container region have an order;
storing data identifying a current container region;
while displaying the plurality of user interface items:
receiving a first gesture input;
determining that the first gesture input corresponds to a request to update the current container region to a new container region identified according to a position in the order for the container regions, and then updating the current container region to be the new container region; and
receiving a second gesture input;
determining that the second gesture input corresponds to a request to present content corresponding to a particular user interface item in the current container region identified according to a position in the order for the one or more user interface items in the current container region; and
presenting content corresponding to the particular user interface item in response to the second gesture input.

21. An apparatus comprising:
a touch-sensitive user interface;
a processor; and
a computer storage medium storing instructions, that when executed by the processor on a device operating in an accessibility mode distinct from a normal mode, cause the processor to perform operations comprising:
defining a plurality of container regions, each container region corresponding to a physical region on a touch-sensitive user interface of a device, the physical region defined so that one or more similar user interface items are displayed in the physical region on the touch-sensitive user interface;
receiving a first touch input at a first location on the user interface;
determining that the first location corresponds to the physical region of a first container region in the plurality of container regions;
receiving a second touch input at a second location on the user interface; and
in response to the second touch input, determining content to present to a user according to a context of the first container region and independent of the second location.

22. The apparatus of claim 21, wherein the instructions further cause the processor to perform an operation of presenting the content using a haptic or an aural presentation.

23. The apparatus of claim 21, wherein:
the first container region includes one or more first user interface items having an order;
the second input identifies a desired location of an item relative to the order; and
determining content to present includes identifying a particular first user interface item at the desired location relative to the order and obtaining content describing the particular first user interface item.

24. The apparatus of claim 21, wherein:
the container regions have an associated order;
the second input identifies a desired location of a container region relative to the order; and
determining content to present includes identifying a second container region at the desired location and obtaining content describing the second container region.

25. The apparatus of claim 24, wherein the second input corresponds to a request for one of: a last container region in the order, a first container region in the order, a next container region in the order, or a previous container region in the order.

26. The apparatus of claim 24, the instructions further causing the processor to perform operations comprising:
storing data identifying the first container region as a current container in response to the first input; and
updating the stored data to identify the second container region as the current container in response to the second input.

27. The apparatus of claim 24, wherein the content describing the second container region is content for an item included in the second container region.

28. A computer storage medium encoded with program instructions that, when executed by data processing apparatus on a device operating in an accessibility mode distinct from a normal mode, cause the data processing apparatus to perform operations comprising:
defining a plurality of container regions, each container region corresponding to a physical region on a touch-sensitive user interface of a device, the physical region defined so that one or more similar user interface items are displayed in the physical region on the touch-sensitive user interface;
receiving a first touch input at a first location on the user interface;
determining that the first location corresponds to the physical region of a first container region in the plurality of container regions;
receiving a second touch input at a second location on the user interface; and
in response to the second touch input, determining content to present to a user according to a context of the first container region and independent of the second location.

29. The computer readable storage medium of claim 28, the instructions further causing the data processing apparatus to perform an operation of presenting the content using a haptic or an aural presentation.

30. The computer readable storage medium of claim 28, wherein:
the first container region includes one or more first user interface items having an order;
the second input identifies a desired location of an item relative to the order; and
determining content to present includes identifying a particular first user interface item at the desired location relative to the order and obtaining content describing the particular first user interface item.

31. The computer readable storage medium of claim 28, wherein:
the container regions have an associated order;
the second input identifies a desired location of a container region relative to the order; and
determining content to present includes identifying a second container region at the desired location and obtaining content describing the second container region.

32. The computer readable storage medium of claim 31, wherein the second input corresponds to a request for one of: a last container region in the order, a first container region in the order, a next container region in the order, or a previous container region in the order.

33. The computer readable storage medium of claim 31, the instructions further causing the data processing apparatus to perform operations comprising:
storing data identifying the first container region as a current container in response to the first input; and
updating the stored data to identify the second container region as the current container in response to the second input.

34. The computer readable storage medium of claim 31, wherein the content describing the second container region is content for an item included in the second container region.

35. The apparatus of claim 19, wherein the first gesture input requests one of a first item in the order for the container regions or a last item in the order for the container regions.

36. The apparatus of claim 19, wherein, after receiving the second gesture, the instructions further cause the processor to perform an operation of storing data indicating a current item in the current container region, wherein:
the current item in the current container region is a first item in an order of items for the current container region;
the first gesture input corresponds to a request to present either the first item in the order of items for the current container region or a previous item in the order of items for the current container region; and
the new container region is a previous container region in the order for the container regions.

37. The apparatus of claim 19, wherein, after receiving the second gesture, the instructions further cause the processor to perform an operation of storing data indicating a current item in the current container region, wherein:
the current item in the current container region is a last item in an order of items for the current container region;
the first gesture input corresponds to a request to present either the last item in the order of items for the current container region or a next item in the order of items for the current container region; and
the new container region is a next container region in the order for the container regions.

38. The apparatus of claim 19, wherein the instructions further cause the processor to perform operations of:
receiving a third gesture input;
determining that the third gesture input corresponds to a request to present content corresponding to another user interface item in the updated current container region; and
presenting content corresponding to the other user interface item in response to the third gesture input.

39. The apparatus of claim 38, wherein the instructions further cause the processor to perform an operation of storing data identifying the particular user interface item as a current user interface item for the current region, wherein the third gesture input corresponds to a request for a previous or next user interface item relative to the current user interface item in the order for the updated current container region.

40. The apparatus of claim 38, wherein the third gesture input corresponds to a request for a first or last user interface item in the order for the updated current container region.

41. The apparatus of claim 19, wherein the instructions further cause the processor to perform the operation of presenting content describing the new container region in response to updating the current container region.

42. The apparatus of claim 19, wherein the instructions further cause the processor to perform the operation of presenting the content includes presenting the item according to one or more preferences of a user.

43. The apparatus of claim 19, wherein the instructions further cause the processor to perform the operation of presenting the content includes presenting content using a haptic or an aural presentation.

44. The apparatus of claim 43, wherein the aural presentation includes synthetic speech.

45. The computer storage medium of claim 20, wherein the first gesture input requests one of a first item in the order for the container regions or a last item in the order for the container regions.

46. The computer storage medium of claim 20, wherein the instructions further cause the data processing apparatus to perform an operation of storing data indicating a current item in the current container region, wherein:
the current item in the current container region is a first item in an order of items for the current container region;
the first gesture input corresponds to a request to present either the first item in the order of items for the current container region or a previous item in the order of items for the current container region; and
the new container region is a previous container region in the order for the container regions.

47. The computer storage medium of claim 20, wherein, after receiving the second gesture, the instructions further cause the data processing apparatus to perform an operation of storing data indicating a current item in the current container region, wherein:
the current item in the current container region is a last item in an order of items for the current container region;
the first gesture input corresponds to a request to present either the last item in the order of items for the current container region or a next item in the order of items for the current container region; and
the new container region is a next container region in the order for the container regions.

48. The computer storage medium of claim 20, wherein, after receiving the second gesture, the instructions further cause the data processing apparatus to perform operations of:
receiving a third gesture input;
determining that the third gesture input corresponds to a request to present content corresponding to another user interface item in the updated current container region; and presenting content corresponding to the other user interface item in response to the third gesture input.

49. The computer storage medium of claim 48, wherein the instructions further cause the data processing apparatus to perform an operation of storing data identifying the particular user interface item as a current user interface item for the current region, wherein the third gesture input corresponds to a request for a previous or next user interface item relative to the current user interface item in the order for the updated current container region.

50. The computer storage medium of claim 48, wherein the third gesture input corresponds to a request for a first or last user interface item in the order for the updated current container region.

51. The computer storage medium of claim 20, wherein the instructions further cause the data processing apparatus to perform the operation of presenting content describing the new container region in response to updating the current container region.

52. The computer storage medium of claim 20, wherein presenting the content includes presenting the item according to one or more preferences of a user.

53. The computer storage medium of claim 20, wherein presenting the content includes presenting content using a haptic or an aural presentation.

54. The computer storage medium of claim 53, wherein the aural presentation includes synthetic speech.

* * * * *